(12) United States Patent
Ruggiero et al.

(10) Patent No.: US 7,229,700 B2
(45) Date of Patent: Jun. 12, 2007

(54) CORROSION-RESISTANT COATING FOR METAL SUBSTRATE

(75) Inventors: Peter F. Ruggiero, Enfield, CT (US); Marc J. Froning, Tolland, CT (US)

(73) Assignee: BASF Catalysts, LLC., Flurham Park, NJ (US)

( * ) Notice: Subject to any disclaimer, the term of this patent is extended or adjusted under 35 U.S.C. 154(b) by 0 days.

(21) Appl. No.: 10/973,502

(22) Filed: Oct. 26, 2004

(65) Prior Publication Data

US 2006/0088725 A1    Apr. 27, 2006

(51) Int. Cl.
*B32B 15/04* (2006.01)
*B32B 15/20* (2006.01)
*B32B 33/00* (2006.01)
*C23C 4/06* (2006.01)
*C23C 4/10* (2006.01)

(52) U.S. Cl. .............. 428/650; 428/325; 428/331; 428/653; 428/654; 428/595; 428/598; 427/192; 427/455; 427/456

(58) Field of Classification Search ........... 428/650, 428/595, 598; 427/192, 193
See application file for complete search history.

(56) References Cited

U.S. PATENT DOCUMENTS

| | | | |
|---|---|---|---|
| 4,515,866 A * | 5/1985 | Okamoto et al. ........... 428/614 |
| 5,221,377 A | 6/1993 | Hunt, Jr. et al. |
| 5,472,793 A * | 12/1995 | Harada et al. .............. 428/552 |
| 6,001,426 A | 12/1999 | Witherspoon et al. |
| 6,068,214 A | 5/2000 | Kook et al. |
| 6,069,211 A | 5/2000 | Reyes, Jr. et al. |
| 2002/0136920 A1* | 9/2002 | McDevitt et al. ........... 428/653 |
| 2002/0194956 A1* | 12/2002 | Russo et al. .................. 75/252 |
| 2004/0247946 A1* | 12/2004 | Seitz .......................... 428/469 |

FOREIGN PATENT DOCUMENTS

| EP | 0822357 | | 2/1998 |
|---|---|---|---|
| SU | 561755 | * | 8/1977 |

OTHER PUBLICATIONS

Materials Engineering, Dec., 1987, pp. 70-75.

* cited by examiner

*Primary Examiner*—Michael E. Lavilla
(74) *Attorney, Agent, or Firm*—Richard A. Negin

(57) ABSTRACT

A novel coating composition is provided for imparting corrosion and wear resistance to metal substrates. The novel coating composition is thermally applied and comprises an aluminum alloy mixed with a hard, inert matrix. The coating composition has found particular use in providing corrosion and wear resistance to metal seat rails used to secure aircrafts seats to the aircraft frame.

29 Claims, 2 Drawing Sheets

CORROSION-RESISTANT COATING FOR METAL SUBSTRATE

FIELD OF THE INVENTION

The present invention is directed to a novel coating composition to be applied by a thermal spray process and a metal substrate coated with the novel coating composition to provide the substrate with corrosion and wear resistance. The invention is particularly concerned with a metal seat rail for supporting aircraft seats and which is provided with the thermally applied novel corrosion- and wear-resistant coating.

BACKGROUND OF THE INVENTION

The application of corrosion-resistant coatings to metal articles in order to protect the surfaces thereof from degradation by oxidation, galvanic, or other chemical attack is a vastly important field of study. Much effort has been devoted to extending the useful life of articles subject to corrosion by coating the article with a corrosion-resistant composition. Coatings are also applied to substrates for protection against wear. Coatings with corrosion-resistant and wear-resistant properties are applied in many different ways. Typically, metal substrates are coated with corrosion- and wear-resistant coatings by dipping the metal article in a bath of the coating or by the use of an applicator such as a spray nozzle, brush, roller, etc. Chemical vapor deposition, as well as electroplating and electroless-plating, have also been utilized. In accordance with the present invention, a corrosion-resistant and wear-resistant coating is applied to a metal substrate to protect the surfaces of the substrate by a thermal spraying process.

Thermal spray processes are a well known family of coating technologies that include detonation guns, high-velocity oxyfuel spray processes, wire-arc spraying, and both air and vacuum plasma spraying. U.S. Pat. No. 5,451,470 of Ashary et al.; U.S. Pat. No. 5,384,164 of Browning; U.S. Pat. No. 5,271,965 of Browning; U.S. Pat. No. 5,223,332 of Quets; U.S. Pat. No. 5,207,382 of Si et al.; and U.S. Pat. No. 4,694,990 of Karlsson et al. collectively describe thermal spray processes, and are herein incorporated by reference.

Thermal spraying is a process of applying coatings of high performance materials, such as metals, alloys, ceramics, cermets, and carbides, onto more easily worked and cheaper base materials. The purpose of the coating is to provide enhanced surface properties to the cheaper bulk material of which the part is made. Because of its ability to deposit virtually any material (and many combinations of materials), thermal spray has a wide and growing range of applications.

Existing thermal spray processes are compared in Table 1.

TABLE 1

Comparison of Thermal Spray Technologies

Flame powder: Powder feedstock, aspirated into the oxygen/fuel-gas flame, is melted and carried by the flame onto the workpiece. Particle velocity is relatively low, and bond strength of deposits is low. Porosity is high and cohesive strength is low. Spray rates are usually in the 0.5 to 9 kg/h (1 to 20 lb/h) range. Surface temperatures can run quite high.
Flame wire: In flame wire spraying, the only function of the flame is to melt the material. A stream of air then disintegrates the molten material and propels it onto the workpiece. Spray rates for

TABLE 1-continued

Comparison of Thermal Spray Technologies materials such as stainless steel are in the range of 0.5 to 9 kg/h (1 to 20 lb/h). Substrate temperatures are from 95 to 205° C. (200 to 400° F.) because of the excess energy input required for flame melting.
Wire arc: Two consumable wire electrodes are fed into the gun, where they meet and form an arc in an atomizing air stream. The air flowing across the arc/wire zone strips off the molten metal, forming a high-velocity spray stream. The process is energy efficient: all input energy is used to melt the metal. Spray rate is about 2.3 kg/h/kW (5 lb/h/kW). Substrate temperature can be low because energy input per pound of metal is only about one-eighth that of other spray methods.
Conventional plasma: Conventional plasma spraying provides free-plasma temperatures in the powder heating region of 5500° C. (10,000° F.) with argon plasma, and 4400° C. (8000 F. °) with nitrogen plasma - above the melting point of any known material. To generate the plasma, an inert gas is superheated by passing it through a dc arc. Powder feedstock is introduced and is carried to the workpiece by the plasma stream. Provisions for cooling or regulation of the spray rate may be required to maintain substrate temperatures in the 95 to 205° C. (200 to 400° F.) range. Typical spray rate is 0.1 kg/h/kW (0.2 lb/h/kW).
Detonation gun: Suspended powder is fed into a 1 m (3 ft) long tube along with oxygen and fuel gas. A spark ignites the mixture and produces a controlled explosion. The high temperatures and pressures (1 MPa, 150 psi) that are generated blast the particles out of the end of the tube toward the substrate.
High-Velocity OxyFuel: In HVOF spraying, a fuel gas and oxygen are used to create a combustion flame at 2500 to 3100° C. (4500 to 5600 F. °). The combustion takes place at very high chamber pressure (150 psi), exiting through a small-diameter barrel to produce a supersonic gas stream and very high particle velocities. The process results in extremely dense, well-bonded coatings, making it attractive for many corrosion-resistant applications. Either powder or wire feedstock can be sprayed, at typical rates of 2.3 to 14 kg/h (5 to 30 lb/h).
Hiqh-energy plasma: The high-energy plasma process provides significantly higher gas enthalpies and temperatures especially in the powder heating region, due to a more stable, longer arc and higher power density in the anode nozzle. The added power (two to three times that of conventional plasma) and gas flow (twice as high) provide larger, higher temperature powder injection region and reduced air entrainment. All this leads to improved powder melting, few unmelts, and high particle impact velocity.
Vacuum plasma: Vacuum plasma uses a conventional plasma torch in a chamber at pressures in the range of 10 to 15 kPa (0.1 to 0.5 atm). At low pressures the plasma is larger in diameter, longer, and has a higher velocity. The absence of oxygen and the ability to operate with higher substrate temperatures produces denser, more adherent coatings having much lower oxide contents.

High quality coatings are "generally" characterized by high adhesion and cohesion strengths, low porosity low oxide inclusions (except for some cases where the phases are small and well dispersed), high hardness, and other properties designed for specific applications such as electrical or magnetic properties, or machinability for finishing.

Particle impact velocity is one of the most important factors in coating quality. One of the main areas of research and innovation in the industry has been the quest for ever higher velocities. Higher velocity impact generally produces denser, harder, and more uniform coatings with less porosity and with higher adhesion and cohesion. Porosity is the largest source of coating failure and is usually indicative of poor coating cohesion and a high degree of unmelted or cold-particle entrapment. High velocity impact forces splats to fill in voids, and the kinetic energy which is converted to heat during the impact reduces the number of unmelted particles, which reduces porosity. Oblique spraying, off perpendicular, should be significantly improved by high velocity, through reduction of shadow porosity effects. In addition, higher velocity tends to produce coatings with less induced stresses.

An aircraft seat is secured by means of a seat rail, which typically includes a central notched groove on the top surface thereof that cooperates with a matching tongue of an interlocking member that secures the seat to the seat rail. During the process of manipulating the seats along the rail to the desired position during installation, reconfiguration, and removal, the groove on the upper surface of the seat rail can get worn. Deep scores, chipped metal, tooling marks, and gouges are typically present. Additionally, vibrations during flight result in constant movement of the seat with the interlocking member against the groove of the seat rail, causing additional wear. Likewise, metal surfaces of the seat rail that are exposed to the environment can corrode due to atmospheric conditions within the plane. Corrosion due to standing water is prevalent. Large amounts of dirt and other organic debris such as food and soft drinks are present in the seat rail groove, providing a constant moist, acidic interface. Corrosion is also observed on all areas of contact between the seat rail and the seat legs where moisture can ingress into mating aluminum surfaces. With the presence of moisture, galvanic effects between the seat rail, interlocking member, and the metal framing to which the seat rail is attached can also cause chemical corrosion along the rail. Generally, the extent of corrosion is proportional to the level of cleanliness of the aircraft interior.

Typically, to reduce wear and corrosion, the seat rails are anodized. Gaps in the corrosion protection, however, include, but are not limited to, all mechanical damage and fastener locations. Corrosion has been found to occur on multiple areas of the seat track and is not always located on corrosion barrier gaps. The seat rails have been painted with an epoxy paint which may contain a corrosion inhibitor well known in the art, such as a chromate-containing corrosion inhibitor. However, it has been found that the coatings previously used for seat rails, in particular aircraft, have not been sufficient to prevent wear within the groove of the seat rail, or to prevent corrosion effects on exposed metal surfaces of the seat rail. Accordingly, the present invention provides a novel coating composition which can be thermally applied to metal surfaces, in particular seat rails for securing aircraft seats, and which has been effective to withstand the wear and corrosion which has plagued these objects.

SUMMARY OF THE INVENTION

A novel coating composition is provided for importing corrosion and wear resistance to metal substrates. In accordance with this invention, the novel coating composition is thermally applied and comprises an aluminum alloy mixed with a ceramic or glass matrix. The coating composition has found particular use in providing corrosion and wear resistance to metal seat rails used to secure aircraft seats to the aircraft frame.

DETAILED DESCRIPTION OF THE INVENTION

Figure 1:
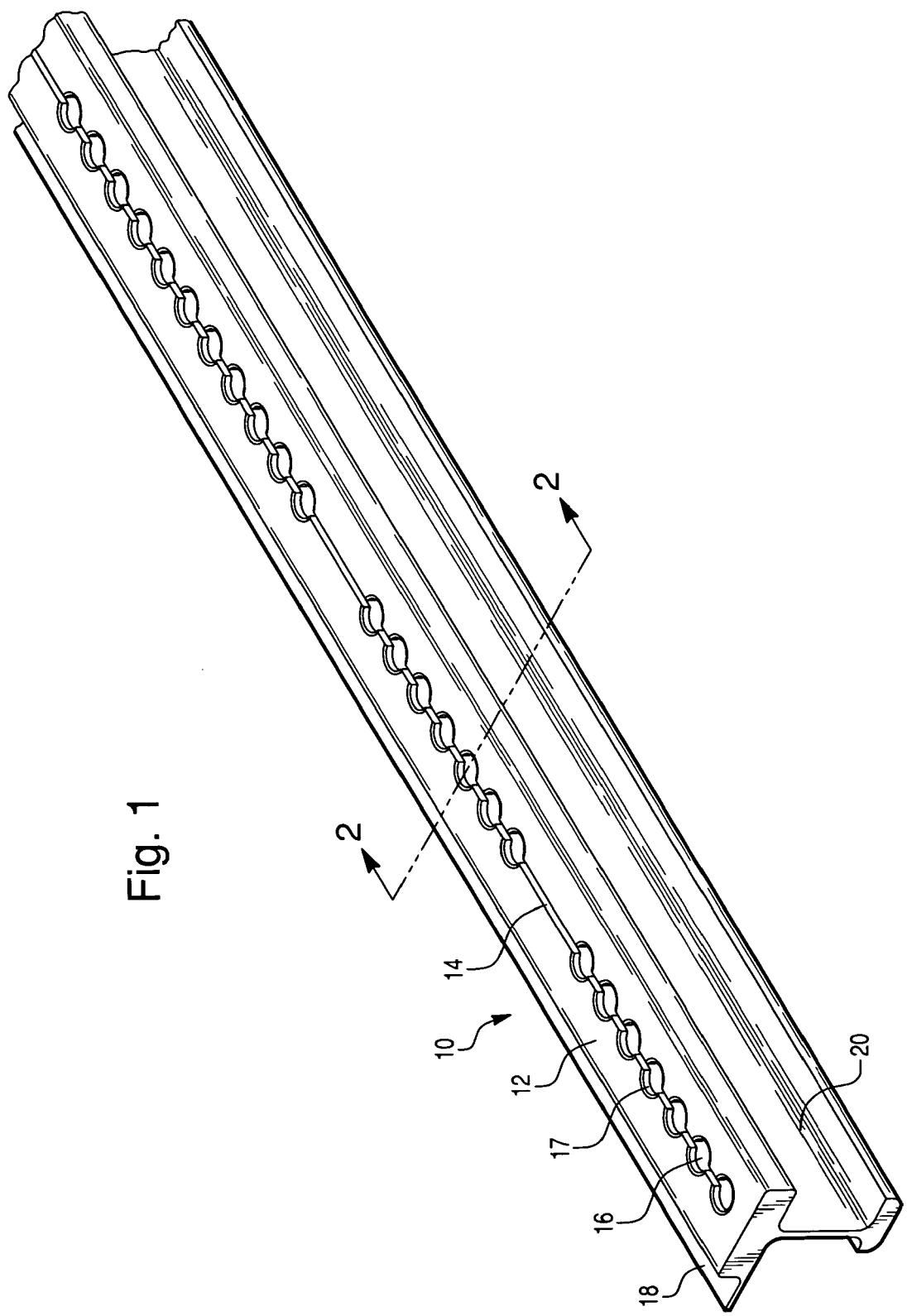
FIG. 1 is a perspective view of a typical seat rail used for securing aircraft seats to the aircraft frame.

The coating composition of the present invention comprises a mixture of an aluminum alloy and a ceramic or glass matrix. The matrix will typically comprise 10–75 vol. % of the coating composition. Amounts of the matrix relative to the coating composition as a whole of about 20–60 vol. %, and ranges of the matrix of 25–50 vol. % are also exemplified. The aluminum alloy comprises an alloy of aluminum with one or more alloying metals such as zinc, magnesium, manganese, or copper. In general, the aluminum alloy comprises at least 0.1 wt. %, up to about 10 wt. %, of the metals other than aluminum. A more typical range would be from about 1–5 wt. % of the alloying metals other than aluminum with the balance being aluminum. While zinc is the preferred alloying metal, the other named metals may be substituted for all or most of the zinc, or added to the zinc component. A typical example which has provided good corrosion resistance is an alloy comprising 95–99 wt. % aluminum and 1–5 wt. % zinc.

The matrix is characterized as being hard and inert with respect to the metal substrate onto which the matrix is applied. In general, the matrix of ceramic or glass will have a Vickers hardness of at least 700 and, preferably, at least 2,000. The matrix of the coating composition of the present invention can be any known metal oxide, metal carbide, metal nitride, or glassy oxide that are known to have appropriate hardness. Non-limiting examples of matrix materials include aluminum oxide, silica, titania, zirconia, thoria, silica-alumina, silica-titania, silica-zirconia, silicon carbide, tungsten carbide, chromium carbide, silicon nitride, borosilicate glasses, and the like. In general, the matrix not only is a hard material, but is unreactive with the aluminum alloy and the substrate surface to which it is applied, and can provide good corrosion resistance to the metal substrate.

The coating composition of the present invention is thermally applied to the metal substrate. Typically, particles of the aluminum alloy and particles of the matrix are mixed and then applied by a thermal spray coating process known as high-velocity oxygen fuel spray (HVOF). Similarly, the aluminum alloy can be formed in-situ by incorporating particles of the aluminum and alloying metal along with the matrix, whereupon at the thermal temperatures of the spraying process, the aluminum and alloying metals such as zinc will form the aluminum alloy in-situ.

The thermal spray coating process termed high-velocity oxygen fuel spray (HVOF) involves the technology of internal burning of a fuel gas in the pressure range of 75–125 pounds per square inch gage (psig). This pressurized burning produces a hot (up to 5,000° F.), extreme velocity exhaust jet stream. The jet stream produced is used to heat and accelerate the powder particles, which can be sprayed on a substrate to build up a coating. The powder is introduced axially and centrally into the exhaust jet. The powder, being completely surrounded by the exhaust gas over a distance of 13" or more, is accelerated and heated uniformly. Particle velocities have been calculated to be about 2,500 feet/second at impact upon the substrate, causing the molten particles to deform and coalesce into all the available pore sites. This kinetic energy and momentum transfer produce a high degree of compressive strengths within the coating. The hot, extremely high velocity particles bond exceptionally well to a to-be-coated surface which has been cleaned. Coatings produced by this process are typically high integrity mechanical/metallurgical bond structures. Metallurgically bonded discrete sites provided by this HVOF coating process are, as a general rule, the result of particles microwelding together on impact.

Although not preferred, other thermal spraying processes as discussed above and set forth in Table 1 may be utilized to apply the coating of this invention to the metal substrate.

The types of metal substrates which can be coated with the novel corrosion- and wear-resistant coating of this invention are essentially unlimited, as it is believed that any metal substrate would benefit from the coating of this invention. In particular, the substrate can be any metal or metal alloy composition which can be formed into articles and coated by the thermal spray process. Aluminum and aluminum alloys, copper and copper alloys, magnesium and magnesium alloys, nickel and nickel alloys, iron and iron alloys such as various steel alloys, tin and tin alloys, titanium and titanium alloys, tungsten, zinc and zinc alloys, etc., which can all be formed into substrates and thermally coated, can be coated by the thermal spray process with the coating composition of the present invention.

In accordance with the present invention, the novel composition of the present invention as described above is particularly useful for providing corrosion and wear resistance for seat rails which are used to secure aircraft seats to the aircraft frame. An example of one such type of seat rail is shown in FIG. 1 as indicated by reference numeral 10. It is to be understood that the invention is not to be limited to the specific seat rail design as shown in FIG. 1, as the art has provided numerous seat rail configurations. Seat rail 10, in general, includes a top surface 12 which contains a track groove 14 and a series of track holes 16 spaced along groove 14. Groove 14 and the holes 16 allow the seats to be installed and manipulated along the track rail 10 and held in place by known interlocking means, which contain tongues or posts to fit within groove 14 and holes 16. The specific configuration of the interlocking means and fitments thereof are not part of the present invention. However, during manipulation of aircraft seats along the track rail 14 and holes 16 during installation, readjustment, or removal, track groove 14 and edges 17 of the track holes 16 can be worn. As the track 14 and track hole edges 17 become worn, the seats may not be as securely fastened to the seat rail 10 as desired, causing possible discomfort or even safety concerns. Likewise, the presence of moisture and organic as well as acidic debris, which may contact the top 12 of seat rail 10 and the edges 17 of track holes 16 may cause corrosion within track groove 14 and track holes 16, again, adversely affecting the secure attachment of the aircraft seat to seat rail 10. Seat rail 10 also includes a lateral flange 18 which can be used to secure the floor panels of the aircraft. Again, moisture and organic debris such as food and soft drink can often contact the flange 18, resulting in corrosion of the metal surfaces. Seat rail 10 further includes an anchoring portion 20, which secures the seat rail to the frame of the aircraft. In as much as the invention is not particularly concerned with the specific configuration of the seat rail, only that the exposed surfaces such as the top 12, track groove 14, track holes 16, and lateral flange 18 can be corroded due to the environment in the aircraft, the specific manner in which the seat track 10 is secured to the aircraft is not part of the invention, and is otherwise well known in the art.

Figure 2:
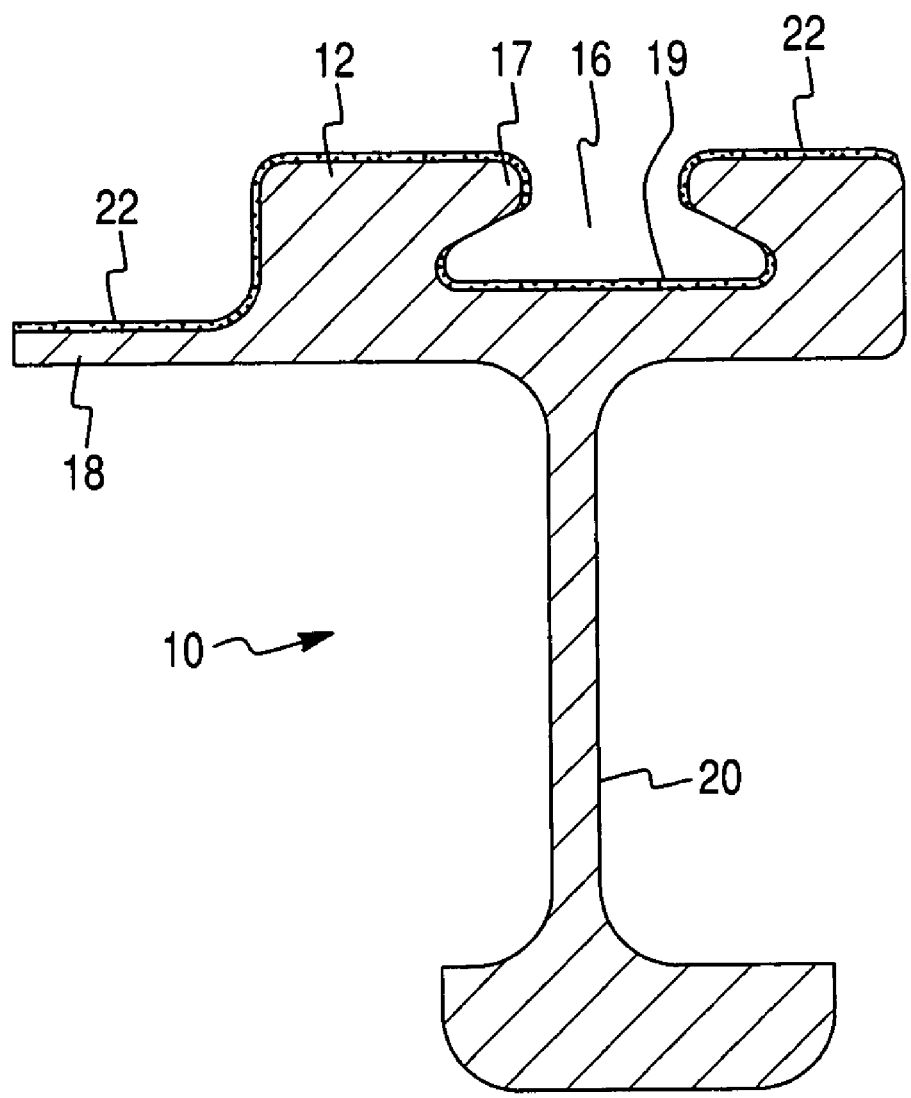
FIG. 2 is a cross-section of the seat rail taken along lines 2—2 of FIG. 1 and showing possible locations of where the corrosion-resistant coating can be applied to the seat rail.

As shown in FIG. 2, the seat rail 10 is provided with a coating 22 in accordance with the present invention and discussed above. Typically, the coating 22 will coat the lateral flange 18, the top surface 12, and along the edges 17 and bottom 19 of track hole 16, as well as the edges and bottom of track groove 14. The coating 22 is thermally applied as described above and provides a dense coating of the composition on those parts of the seat rail which are prone to corrosion and wear.

EXAMPLES

Example 1

A coating composition is prepared comprising 50 vol. % of a powder mixture containing 97 wt. % aluminum particles and 3 wt. % zinc particles, and 50 vol. % of an alumina powder having an average particle size of about 500 microns. The composition is sprayed onto 4-inch by 4-inch aluminum panels by HVOF spraying at a flame temperature of 5,000° F. and a coating rate of 7 lb/hr. The nozzle is spaced 1.5 feet from the panels. A hard, dense, and smooth coating results on the panels.

Example 2

Particles of an aluminum alloy comprising 98 wt. % aluminum, 1.5 wt. % manganese, and 0.5 wt. % copper are mixed with a ceramic powder comprising 85% silicon carbide and 15% silicon nitride. The ceramic has a particle size ranging from about 100–1,000 microns. The ceramic powder comprises 40 vol. % of the coating mixture. The coating mixture is applied onto 4-inch by 4-inch aluminum panels using HVOF spraying at a flame temperature of 5,000° F. and a coating rate of 20 lb/hr. The spray nozzle is placed 1.5 feet from the aluminum panels. A dense, hard coating results.

Example 3

A coating composition is fed to an HVOF thermal spraying device for coating 4-inch by 4-inch aluminum panels. The coating composition comprises an aluminum alloy precursor comprising 95 wt. % aluminum particles and 5 wt. % zinc particles. A matrix comprising 95% alumina and 5% silica makes up 40 vol. % of the coating composition. The matrix component comprises particles ranging in size from 50 microns to about 750 microns. The aluminum panels are provided with an even, hard, dense coating. The aluminum particles and the zinc particles form an alloy during the spraying process.

What is claimed is:

1. An aluminum or aluminum alloy metal substrate coated by a high-velocity oxygen fuel thermal spray coating process with a corrosion- and wear-resistant coating composition comprising an aluminum-zinc alloy containing 0.1–10 wt. % zinc mixed with a hard, inert matrix.

2. The coated substrate of claim 1 wherein said matrix is selected from the group consisting of metal oxides, metal carbides, metal nitrides, borosilicate glasses, and mixtures thereof.

3. The coated substrate of claim 1 wherein said matrix comprises 10–75% by volume of said composition.

4. The coated substrate of claim 1 wherein said matrix comprises 25–50% by volume of said composition.

5. The coated substrate of claim 2 wherein said matrix comprises alumina.

6. The coated substrate of claim 1 wherein said aluminum-zinc alloy consists essentially of aluminum and from 1–5 wt. % zinc.

7. The coated substrate of claim 6 wherein said matrix consists essentially of alumina.

8. The coated substrate of claim 1 wherein said matrix has a Vickers hardness of at least 700.

9. The coated substrate of claim 8 wherein said matrix has a Vickers hardness of at least 2,000.

10. In a seat rail for securing an aircraft seat, wherein said seat rail is formed of aluminum or aluminum alloy, the improvement comprising said seat rail being coated with a corrosion-and-wear-resistant coating composition comprising an aluminum alloy mixed with a hard, inert matrix.

11. In the seat rail of claim 10, wherein said seat rail contains a top surface having a longitudinal groove and spaced holes along said groove, said holes having a circumferential edge and a bottom, said coating composition coating said top and at least along said edges of said holes.

12. In the seat rail of claim 11 wherein said seat rail includes a lateral flange, said lateral flange being coated with said composition.

13. In the seat rail of claim 10 wherein said matrix comprises 10–75% by volume of said composition.

14. In the seat rail of claim 10 wherein said matrix comprises alumina.

15. In the seat rail of claim 10 wherein said aluminum alloy coating is an aluminum-zinc alloy.

16. In the seat rail of claim 15 wherein said aluminum-zinc alloy consists essentially of aluminum and from 1–5 wt. % zinc.

17. In the seat rail of claim 16 wherein said matrix consists essentially of alumina.

18. A seat rail for supporting an aircraft seat, wherein said seat rail is formed of aluminum or aluminum alloy, and wherein said seat rail comprises at least one surface that can be worn and/or corroded and which allows said seat to be installed and manipulated along said rail, and wherein said at least one surface is coated with a corrosion-and-wear-resistant coating composition comprising an aluminum alloy mixed with a hard, inert matrix.

19. The seat rail of claim 18 containing a top surface having a longitudinal groove and spaced holes along said groove, said holes having a circumferential edge and a bottom, said coating composition coating said top and at least along said edges of said holes.

20. The seat rail of claim 19 wherein said seat rail includes a lateral flange, said lateral flange being coated with said composition.

21. The seat rail of claim 18 wherein said matrix comprises 10–75% by volume of said composition.

22. The seat rail of claim 18 wherein said matrix comprises alumina.

23. The seat rail of claim 18 wherein said aluminum alloy coating is an aluminum-zinc alloy.

24. The seat rail of claim 23 wherein said aluminum-zinc alloy consists essentially of aluminum and from 1–5 wt. % zinc.

25. The seat rail of claim 24 wherein said matrix consists essentially of alumina.

26. A method of coating a metal surface with a powder coating composition comprising applying an aluminum alloy mixed with a hard, inert matrix by a high-velocity oxygen fuel thermal spray coating process, wherein said aluminum alloy comprises aluminum and from about 0.1–10 wt. % of Zn.

27. The method of claim 26 wherein said matrix is selected from the group consisting of metal oxides, metal carbides, metal nitrides, borosilicate glasses, and mixtures thereof.

28. The method of claim 26 wherein said aluminum alloy is aluminum and 1–5 wt. % zinc.

29. The method of claim 28 wherein said matrix is alumina.

* * * * *